June 2, 1931. H. C. EDDY 1,807,833
FILTRATION PROCESS FOR BREAKING EMULSIONS
Filed Dec. 28, 1926
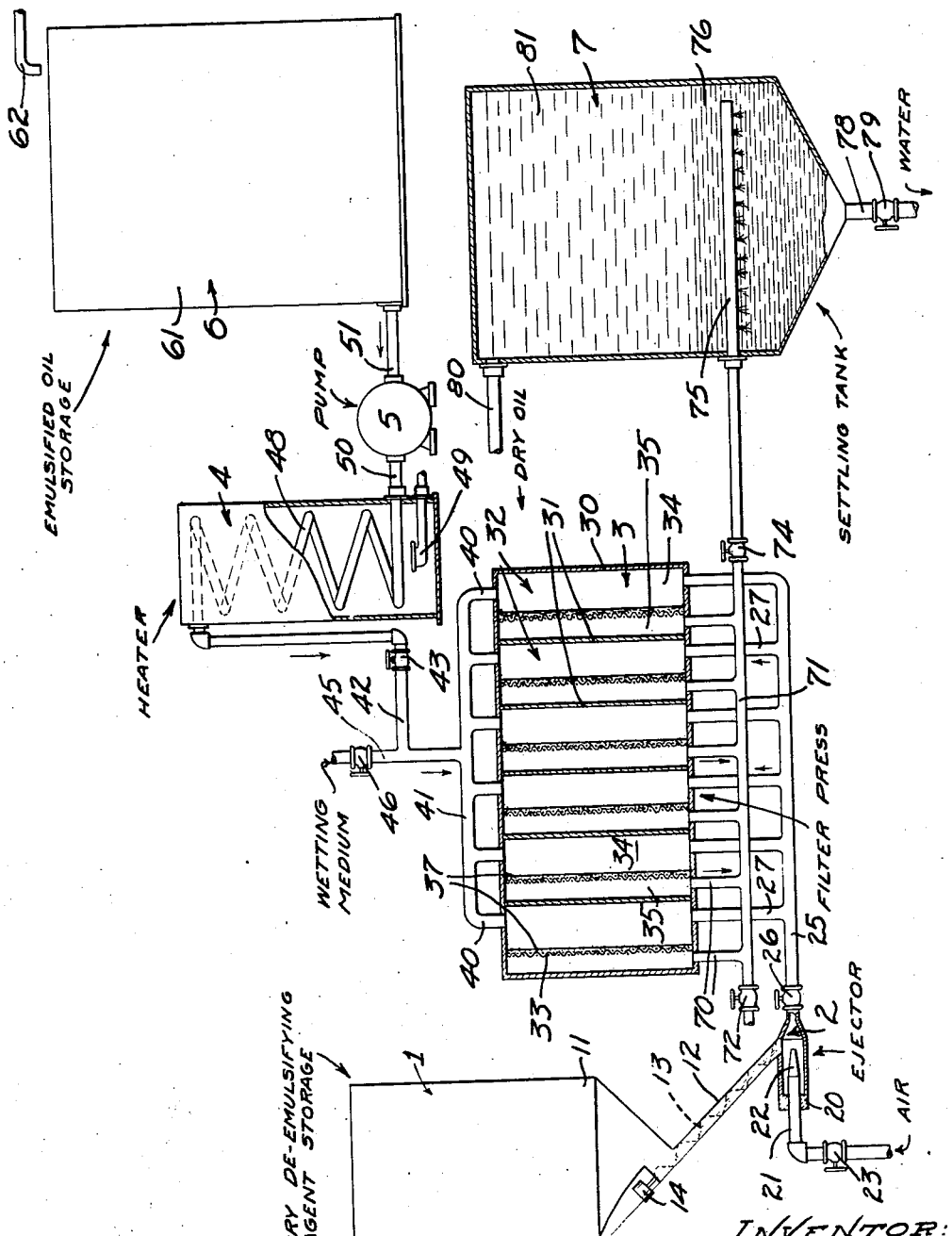
INVENTOR:
HAROLD C. EDDY
BY 
ATTORNEY.

Patented June 2, 1931

1,807,833

UNITED STATES PATENT OFFICE

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

FILTRATION PROCESS FOR BREAKING EMULSIONS

Application filed December 28, 1926. Serial No. 157,528.

My invention relates to a process of coating a screen with a porous material, and it relates particularly to a process of de-emulsifying petroleum emulsion.

In the petroleum industry the petroleum sometimes becomes associated with water and is converted into an emulsion. Before the petroleum is of any commercial value the water content must be reduced to at least below 3%. One manner of removing the water from the emulsion is to pass the emulsion through a filter press. The chief difficulty encountered in breaking down emulsions by the filtration process is the forming and reforming of the porous coating.

I have found that the reforming of the porous coating may be accomplished by blowing, by means of compressed air, a material in the form of a dry powder onto the filter plate, which usually consists of a sheet of canvas, where it automatically distributes itself evenly over the surface of the plate. While the powdered material is still maintained in place by the pressure of the air, it is wetted by means of a liquid, and is thus caused to adhere to the filter plate.

It is accordingly one of the objects of this invention to provide a process of coating a filter plate with a powdered material.

I have found that a porous diaphragm formed according to the process of my invention just described is very effective in agglomerating the dispersed phase of a petroleum emulsion if the porous coating is made from a proper de-emulsifying substance.

It is an important object of this invention to provide a process of de-emulsifying petroleum emulsion by passing it through a porous material formed of a de-emulsifying agent.

Other objects and advantages of the invention will be made evident hereinafter.

My invention is best illustrated in the accompanying drawing in which 1 is a dry de-emulsifying agent storage; 2 is an ejector; 3 is a filter press; 4 is a heater; 5 is a pump; 6 is an emulsified oil storage; and 7 is a settling tank.

The de-emulsifying agent storage 1 is in the form of a tank 11 which is connected by a chute 12 to the ejector 2. The tank 11 is adapted to contain a de-emulsifying agent which comprises the powdered material employed in the invention. For the purpose of controlling the feeding of the powdered material to the ejector 2 I provide a conveyor 13 which extends through the chute 12. The conveyor 13 has an external pulley 14 by means of which it may be mechanically driven. The ejector 2 consists of a body 20 to which the chute 12 is connected. Extended into the body 20 is an air pipe 21 having a nozzle 22 on the end which resides within the body 20. The pipe 21 is provided with a valve 23. Connected to the right end of the body 20 of the ejector 2 is a pipe 25 having a valve 26 and having branches 27 which are connected to the filter press 3.

The filter press 3 consists of a shell 30 which is divided by septums 31 into a plurality of chambers 32. Disposed in each chamber 32 is a filter plate 33. The filter plates 33 are preferably formed of canvas or other equivalent porous material. The filter plates 33 divide each chamber 32 into a pressure chamber 34 and an exhaust chamber 35. Each of the branches 27 connects to a pressure chamber 34 of one of the chambers 32 and is adapted to deliver the powdered material thereto so as to form coats on the filter plates 33 as indicated at 37.

Connected to the upper parts of each pressure side 34 is an inlet branch 40 which connects to a manifold pipe 41. The manifold pipe 41 is connected by means of a pipe 42 having a valve 43 to the heater 4. Connected to the pipe 42 is an auxiliary pipe 45 having a valve 46, through which a wetting medium may be supplied to the pressure chambers. The heater 4 may be any conventional form, having a coil 48 and a burner 49 for applying heat to the coil.

Emulsion is delivered to the heater 4 by means of a pipe 50 which is connected to the pump 5. The pump 5 is connected to the storage 6 by means of a pipe 51.

The storage 6 is formed from any suitable tank indicated by the numeral 61, emulsion being supplied thereto by any suitable means such as a pipe 62.

Connected to the lower parts of the exhaust chambers 35 are outlet branches 70 which connect to an outlet pipe 71. At one end of the filter press 3 the outlet pipe 71 is provided with a valve 72 which, when open, connects the pipe to the atmosphere or to a suitable air exhaust. The other end of the outlet pipe 71 is provided with a valve 74 and is connected to the settling tank 7. The end of the outlet pipe 71 which projects into the settling tank 7 is provided in the form of a spray 75 which introduces the treated emulsion into a body of water 76. The lower end of the settling tank 7 is provided with a water outlet pipe 78 having a valve 79. The upper end of the tank 7 is provided with a dry oil outlet pipe 80 through which dry oil, which forms a body 81 in the upper end of the tank 7, may be withdrawn therefrom.

The operation of the invention is substantially as follows:

In starting up the apparatus, let us consider that all valves are closed. The filter plates 33 at this time have no coats of porous material thereon; therefore, the first step is to apply the coats 37 thereto. This is accomplished by opening the valves 23, 26, and 72, and by setting the conveyor 13 into operation. The pipe 21 introduces air or an equivalent gas under pressure into the body 20 of the ejector 2. Powdered material is also introduced into the body by means of the conveyor 13. The air catches the powdered material and carries it through the pipe 25 and the branches 27 into the pressure chambers 34. The air passes through the filter plates 33 outward through the outlet branches 70 and is delivered to the outlet pipe 71. The valve 72 is open and the air passes to the atmosphere or a suitable air exhaust. The powdered material is too coarse to pass through the interstices of the filter plates 33 and therefore collects thereon in the form of the porous coats 37. The powdered material is quite evenly distributed over the surfaces of the filter plates and after a proper amount of powdered material is formed on the filter plates, the operation of the conveyor 13 is stopped the air pressure being still maintained in order to hold the coats 37 in place.

The next step in the process is to cause the coats 37 to adhere to the filter plates 33. This is accomplished by opening the valve 46 in the auxiliary pipe 45 and supplying a liquid to the pressure chambers 34. This liquid passes through the coats 37, wetting them, thus causing them to adhere to the filter plates. The liquid used for wetting the coats 37 may be oil or water or it may be in the form of a gas carrying wetting particles. The wetting medium passes through the outlet branches 70 and the outlet pipe 71 to the atmosphere.

The next step in the process is to pass the emulsion through the filter press. At this time the valves 23, 26, 46 and 72 are closed, and the valves 43 and 74 are opened. The pump 5 is set into operation and emulsion is withdrawn from the storage 6 and passed through the heater 4 where it is raised in temperature for the purpose of facilitating the agglomerating action which takes place in the filter press. The hot emulsion is delivered by the piping shown in the drawing to the pressure sides 34 of the chambers 32 and is caused to pass through the porous diaphragms formed by the filter plates 33 and the coats 37 where it is acted upon in such a manner that a separation of the oil and water will readily take place when the treated emulsion is allowed to settle. Little or no separation takes place during the passage through the porous diaphragm. The emulsion thus treated passes through the outlet branches 70 and the outlet pipe 71 into the settling tank 7 where it is sprayed by means of the spray pipe 75 into the body of water 76. The water particles remain in the lower end of the settling tank 7 but the oil which separates readily from the water rises to the upper part of the settling tank and is withdrawn through the dry oil pipe 80. The water collecting in the bottom of the settling tank is withdrawn constantly or at intervals through the pipe 78.

When the coats 37 become inefficient in treating the emulsion or become washed away they may be readily replaced by the steps described in the first part of the process.

The powdered material utilized may be any of a number of powdered agents known to the art, that agent being selected which best performs the filtering step with the particular substance being filtered. However, when emulsions are being agglomerated, it is preferable to utilize a powdered material which is a de-emulsifying agent, as previously mentioned. Such agents may be diatomacious earth, fuller's earth (either untreated or treated with phenol), powdered coke, and, in some instances, powdered marble. With certain emulsions acid treated clays are effective.

I claim as my invention:

1. A process of separating the phases of an emulsion, which includes the steps of: forming a porous diaphragm by coating a filter plate with a powdered de-emulsifying agent; subsequently wetting said coating of powdered de-emulsifying agent to cause it to adhere to said filter plate; passing said emulsion through said porous diaphragm; and subsequently separating said phases.

2. A process of separating the phases of an emulsion, which includes the steps of: mixing a powdered de-emulsifying agent and a gas to form a mixture; forcing said mixture into the vicinity of a filter plate having openings too small in size to allow passage of said powdered de-emulsifying agent which agent is deposited on said filter plate while said gas passes therethrough; wetting the coating of de-emulsifying agent thus deposited and before the flow of gas through said filter plate is arrested, said filter plate and said coating thus forming a porous diaphragm; passing said emulsion through said porous diaphragm; and subsequently separating said phases.

3. A process of separating the phases of an emulsion, which includes the steps of: blowing a finely divided dry de-emulsifying agent onto a filter plate to form a coating; wetting said coating to cause it to adhere to said filter plate, said coating and said filter plate cooperating in forming a porous diaphragm; passing said emulsion through said porous diaphragm; and subsequently separating said phases.

4. A method of forming a porous diaphragm suitable for agglomerating the dispersed phase of a petroleum emulsion, which method includes the steps of: blowing a coating of powdered material onto a filter plate; and wetting said coating with a wetting medium to hold it in place.

5. A method of forming a porous diaphragm suitable for agglomerating the dispersed phase of a petroleum emulsion, which method includes the steps of: mixing a powdered medium with a gas to form a mixture; and forcing said mixture into a space adjacent a filter plate having openings too small in size to allow a passage of said powdered material, said powdered material being thus deposited on said filter plate to form a coating while said gas passes therethrough.

6. A method of forming a porous diaphragm suitable for agglomerating the dispersed phase of a petroleum emulsion, which method includes the steps of: mixing a powdered medium with a gas to form a mixture; forcing said mixture into a space adjacent a filter plate having openings too small in size to allow a passage of said powdered material, said powdered material being thus deposited on said filter plate to form a coating while said gas passes therethrough; and wetting said coating with a wetting medium before the flow of said gas through said filter plate is arrested.

In testimony whereof, I have hereunto set my hand at Los Angeles, California, this 23rd day of December, 1926.

HAROLD C. EDDY.